(12) United States Patent
Zech

(10) Patent No.: US 8,985,340 B2
(45) Date of Patent: Mar. 24, 2015

(54) HANDLING INSTALLATION, IN PARTICULAR FOR CONTAINERS, WITH A RETROACTIVE CORRECTION CAPABILITY

(75) Inventor: Thomas Zech, Donaustauf (DE)

(73) Assignee: Krones AG (DE)

( * ) Notice: Subject to any disclaimer, the term of this patent is extended or adjusted under 35 U.S.C. 154(b) by 284 days.

(21) Appl. No.: 12/866,834

(22) PCT Filed: Feb. 11, 2009

(86) PCT No.: PCT/EP2009/051519
§ 371 (c)(1),
(2), (4) Date: Aug. 9, 2010

(87) PCT Pub. No.: WO2009/101087
PCT Pub. Date: Aug. 20, 2009

(65) Prior Publication Data
US 2010/0324723 A1    Dec. 23, 2010

(30) Foreign Application Priority Data

Feb. 11, 2008 (DE) .......................... 10 2008 008 528

(51) Int. Cl.
| | |
|---|---|
| *B07C 5/00* | (2006.01) |
| *B67C 3/00* | (2006.01) |
| *B29C 49/42* | (2006.01) |
| *B29C 49/06* | (2006.01) |
| *B65B 57/12* | (2006.01) |
| *B67C 3/22* | (2006.01) |

(52) U.S. Cl.
CPC ................. *B67C 3/007* (2013.01); *B29C 49/42* (2013.01); *B29C 49/06* (2013.01); *B65B 57/12* (2013.01); *B67C 2003/227* (2013.01)
USPC ........................................... 209/523; 700/223

(58) Field of Classification Search
CPC ........ B07C 5/122; B07C 5/124; B07C 5/126; B07C 5/128; B07C 5/3404
USPC ........... 209/522, 523, 529; 700/223; 264/40.1
See application file for complete search history.

(56) References Cited

U.S. PATENT DOCUMENTS

| | | | | |
|---|---|---|---|---|
| 3,941,686 A | * | 3/1976 | Juvinall | 209/523 |
| 4,691,496 A | | 9/1987 | Anderson et al. | |
| 5,591,462 A | * | 1/1997 | Darling et al. | 425/173 |
| 6,584,805 B1 | * | 7/2003 | Burns et al. | 65/29.12 |
| 7,399,435 B2 | * | 7/2008 | Dunzinger et al. | 264/40.1 |
| 7,571,585 B2 | * | 8/2009 | Till | 53/167 |
| 7,607,545 B2 | * | 10/2009 | Daniel | 209/523 |
| 2009/0071104 A1 | | 3/2009 | Fischer | |
| 2009/0294069 A1 | * | 12/2009 | Kramer et al. | 156/362 |
| 2010/0011712 A1 | * | 1/2010 | Till | 53/467 |
| 2011/0033269 A1 | * | 2/2011 | Bierschneider | 414/222.02 |

FOREIGN PATENT DOCUMENTS

| | | |
|---|---|---|
| DE | 43 32 645 A1 | 3/1995 |
| DE | 102 59 589 B3 | 4/2001 |
| DE | 10 2005 060 814 A1 | 7/2007 |
| WO | 00/78664 A1 | 12/2000 |
| WO | 2006/097243 A2 | 9/2006 |

* cited by examiner

*Primary Examiner* — Joseph C Rodriguez
(74) *Attorney, Agent, or Firm* — Onello & Mello, LLP

(57) ABSTRACT

A device and a method for the handling of containers with a plurality of handling units recognize a defective state in a handling element situated downstream and, as a reaction to this recognition, a specified container conveyed upstream is separated out, namely preferably that container which in the further course of operation would arrive at the handling element known to be operating defectively.

22 Claims, 2 Drawing Sheets

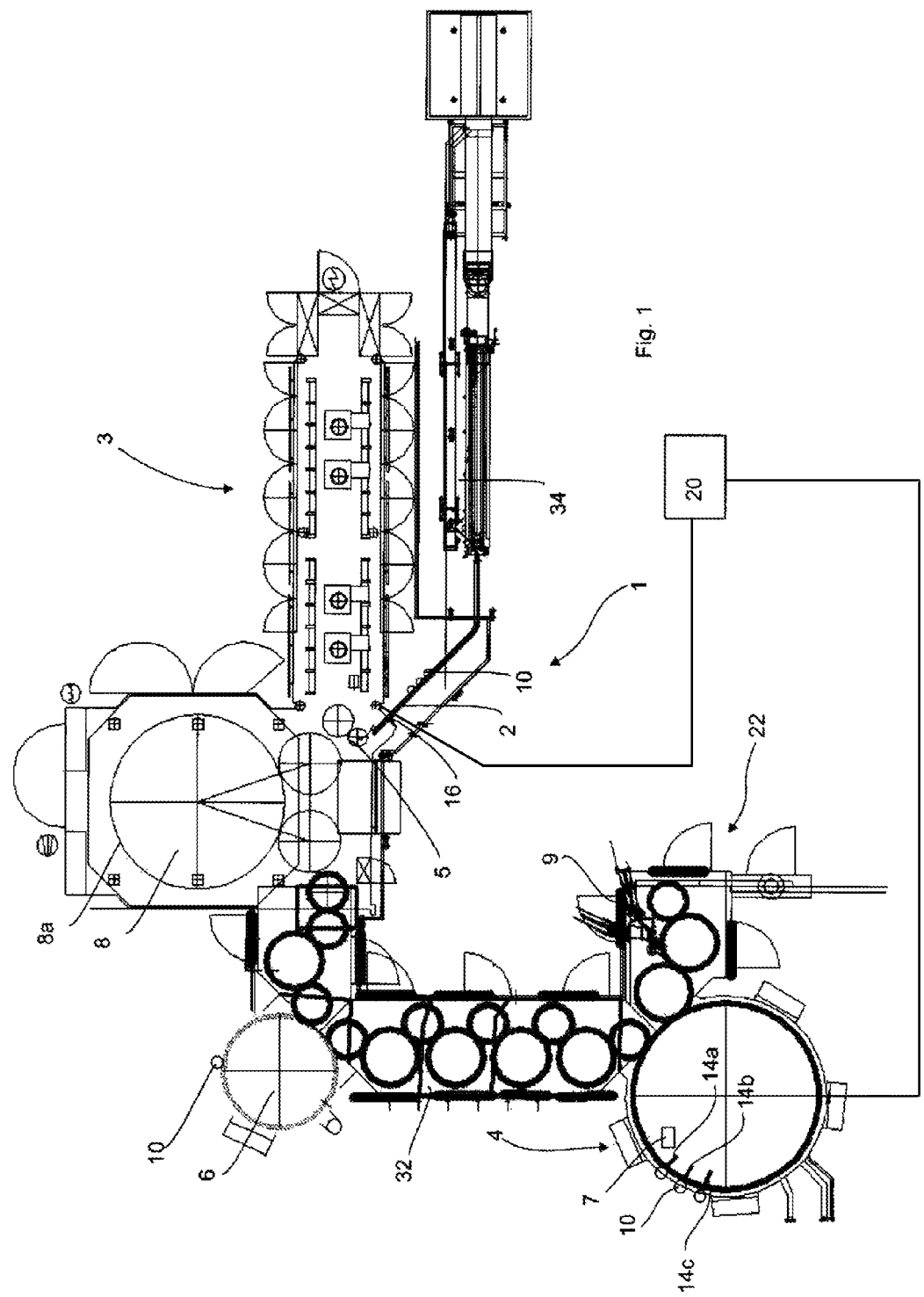

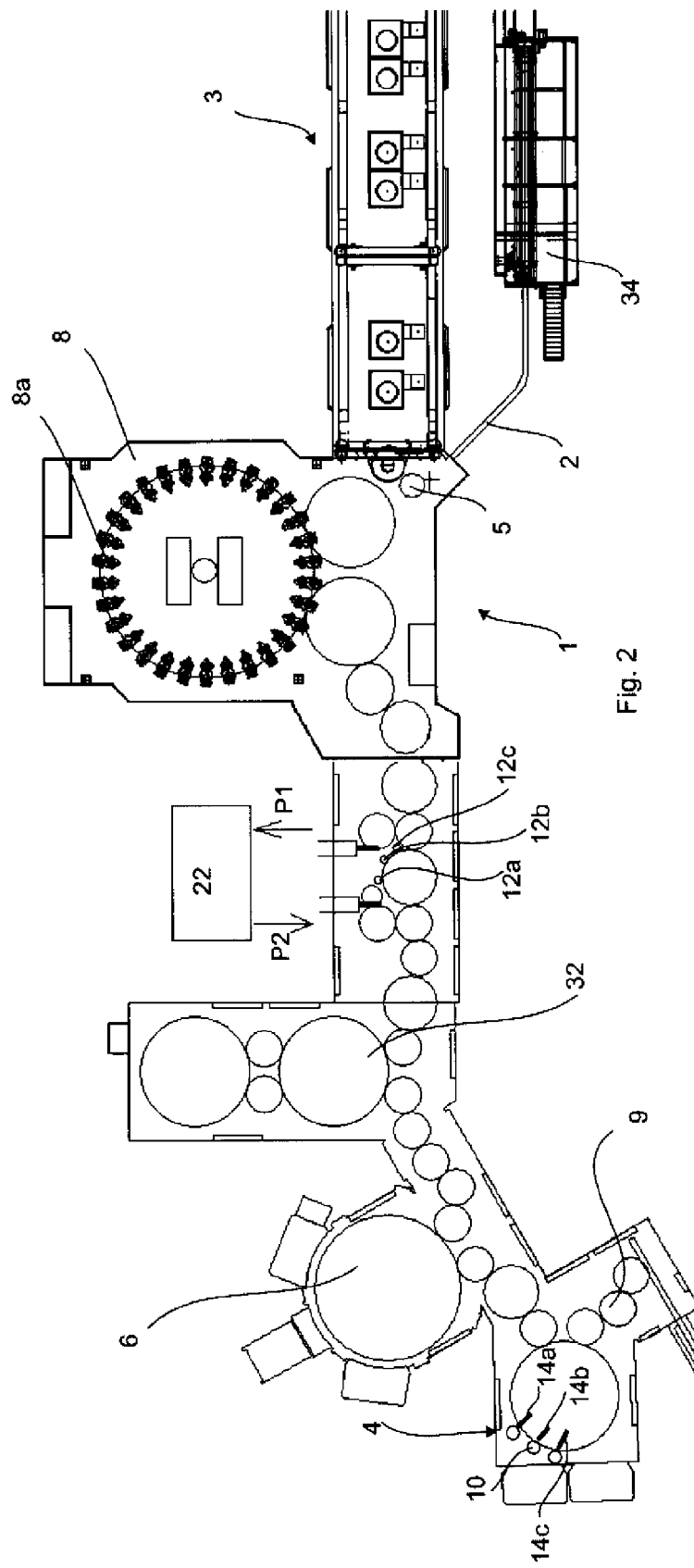

HANDLING INSTALLATION, IN PARTICULAR FOR CONTAINERS, WITH A RETROACTIVE CORRECTION CAPABILITY

CROSS-REFERENCE TO RELATED APPLICATION

This application is filed under 35 U.S.C. 371 as a U.S. national phase application of PCT/EP2009/051519, having an international filing date of Feb. 11, 2009, which claims the benefit of German Patent Application No. 10 2008 008 528.6 having a filing date of Feb. 11, 2008, the contents of which are hereby incorporated by reference in their entirety.

TECHNICAL FIELD

The present invention relates to a method and a device for closing containers. Such devices for closing containers have long been known from the prior art. Usually a container for a beverage bottle is filled with the beverage and then closed. During this closing, a screw cap is screwed onto the container. The plastic screw closure which is screwed onto the container should meet a number of requirements. On the one hand, it must ensure leaktightness, even in the case of high internal pressures. Furthermore, it should offer protection against manipulated opening, including by means of a visible tamper-proof strip, and finally the screw closure should be able to be produced at a reasonable price.

BACKGROUND

The present invention relates to a device for the handling of containers. Devices of this type are known from the prior art. It is thus known that in the context of block installations, i.e. installations of which the operating units are synchronized with one another, pre-forms are first heated and are then expanded to form containers. After that, these expanded containers are cleaned and are finally filled with a drink.

WO 00/078664 A1 describes a filling device for filling bottles. In this case a blow-moulding machine for producing the bottles, a rinsing machine for cleaning the finished blow-moulded bottles and a filling machine for filling the bottles are capable of being driven in synchronism with one another, and the bottles are transferred between the machines with proper spacing by conveying elements engaging with positive locking.

A method and a device relating to the sterile filling of liquids are known from WO 2006/097243 A2. In this case the bottles are first sterilized with $H_2O_2$ and are then filled.

DE 10 2005 060 814 A1 discloses a device and a method for blow-moulding containers. In this case an inspection device for transmitting information is connected to a blow-moulding device arranged downstream in the conveying direction of the containers, so that pre-moulds recognized as being defective are not blow-moulded to form containers. In this way, containers specified here are recognized as being defective and the further handling of these containers is interrupted at a later point in time.

DE 102 59 589 B3 describes a method and a device for producing hollow bodies of plastics material. In this case pre-forms are monitored before heating and at least some of the defective pre-forms are heated and are discarded only after the heating.

In such block installation components, i.e. in particular installation components synchronized with one another, the problem frequently arises, however, that an error is present in an installation component situated downstream, for example an individual valve is defective in a filling machine, and therefore a corresponding container cannot be filled correctly. In the case of installations from the prior art this leads to considerable wastage. Firstly the container in question is produced unnecessarily or sterilized unnecessarily. In addition, the contents to be bottled also frequently go to waste, since, as mentioned, they were bottled erroneously and this container is discarded. It may therefore be desirable to provide a handling installation, in particular for containers, which permits a more economical operation.

SUMMARY

A device according to the invention for the handling of containers has a first handling unit which handles the containers in a first pre-set manner. Furthermore, a second handling unit is provided which is arranged downstream with respect to the first handling unit in the conveying direction of the containers, the second handling unit having a plurality of handling elements for handling the containers. According to the invention the second handling unit has at least one state-recognition device, which recognizes an atypical state of at least one handling element and one container handled by this handling element, and at least one control device which assigns to this handling element or to the container handled by this handling element at least one container to be handled upstream with respect to this handling element.

The terms "upstream" and "downstream" are to be understood with respect to the conveying or transporting direction of the containers, such as for example the bottles, through the device. Handling the bottles is to be understood as being any procedure which affects the containers in any way, in particular heating the containers, expanding pre-forms to form containers, disinfecting containers, rinsing containers, filling containers, closing, labelling and/or printing containers and also conveying the containers both in a separated form and in a non-separated form.

A state-recognition device is to be understood as being a device which detects a physical state of the handling unit or of the handling element or the container, such as for example the operational capability of a valve, the operational capability or the opening state of a gripper element, a closure member and the like.

An atypical state is to be understood as being a state which deviates from a normal operating state. In particular, the atypical state involves a defect of the handling element such as for example a non-functioning valve of a rinser or a filling machine, a non-functioning gripper device or the like. It would also be possible, however, to recognize an atypical state of the container. In this way it is possible in part for individual containers to be formed in a defective manner, but for this defective construction to be attributed to a defective handling procedure, such as for example a defective blow-moulding procedure.

It is thus proposed within the scope of the present invention to detect a fault occurring subsequently in the context of the handling process and after that to determine in particular the containers—present earlier in the handling procedure—to which this fault should be attributed. In this way, it is possible for example for a specific valve of the bottling plant to be faulty. According to the invention it is determined which containers still situated upstream will be associated with just this valve in the further course of the process. These containers can then be handled in a special way, for example they can be diverted beforehand, or at least the defective valve is not actuated. In this way it is possible to avoid the occurrence of wastage, such as for example unnecessarily sterilized containers or unnecessarily filled containers. In this way, for example, an intentional gap can be made in the case of the non-operative valve or the valve not operating properly.

In other words, if the operation of a module has been impaired so that proper handling of the container is not possible in this module, then for example a pre-form which would subsequently enter the faulty module or the faulty station is barred. In this way, less loss of material is caused, a charge can be produced complete and the fault can subsequently be rectified, and this may be advantageous particularly in the case of sterile installations. A corresponding offset must thus be calculated in such a way that a gap occurs for example precisely at the faulty station. In the prior art an incorrectly filled bottle was until now recognized and discarded downstream of the device by way of a monitoring system, and this resulted in an increased loss of material (pre-form, product, and possibly the closure and label).

In a further advantageous embodiment the device has a separating device which separates out the container to be handled by the handling element. In this way that container which would subsequently encounter the faulty handling element is sorted out beforehand. Containers are to be understood in this case as being both the finished blow-moulded containers and any preliminary stages such as pre-forms. For example it would be possible to provide a pre-form barrier which would stop or separate out specific pre-forms. In this case it should be pointed out that the pre-forms are supplied for example by way of a stowing path and the actual clock-timing starts only at the end of this stowing path. A stopping or separating mechanism can be provided in this area.

In a further preferred embodiment the control device causes every n-th container to be separated out, n being the number of the second handling units. If for example filling valve No. 56 (of 120 altogether) is faulty and is supplying overfilled or underfilled bottles, in this way every 120th pre-form is not let into the block, which would subsequently arrive at filling valve No. 56. Other possibilities of separation out, however, would also be possible, such as for example the containers first being blow-moulded and then being separated out. In the present case for example every 120th bottle will be separated out. With an operating capacity of for example 36,000 bottles per hour, in this way altogether 300 bottles per hour would be separated out, i.e. these bottles need not be sterilized, filled, closed or labelled unnecessarily. A considerable reduction in losses of material can be achieved in this way. The loss of production can nevertheless be lower than in the case of a prolonged stoppage of the installation for rectifying the fault during operation, in particular, if a renewed sterilization of the installation were to be necessary. Operations of this type can then be carried out at the end of a shift.

In a further advantageous embodiment the separating device is arranged upstream with respect to the second handling unit, i.e. in the direction of movement of the containers in front of the second handling unit. In this way, as mentioned above, a reduction in losses can be achieved.

In a further advantageous embodiment the second handling unit is a bottling device for the containers. It would also be possible, however, for the second handling unit to be a sterilization device, a blow-moulding device, a washing device or closure device for containers or the like.

In a further advantageous embodiment the first handling unit is a conveying device for the pre-forms, a conveying device also being understood in this case as being a stowing path along which the containers or the pre-forms are conveyed (possibly also not separately). Furthermore, the first handling unit could also, however, be a heating device for pre-forms, a blow-moulding device for the pre-forms, a cleaning device or a disinfecting device for the containers and the like.

In a further advantageous embodiment the device has a buffering unit for separated containers. As mentioned above, it would be possible to separate out already specified pre-forms. This would have the result, however, that on account of the precisely dimensioned heating parameters the pre-form situated in front of the separated pre-form and the pre-form situated after the separated pre-form would also have to be separated (after the heating procedure). For this reason it is proposed in a preferred arrangement for all the containers first to be blow-moulded and then, however, for the precisely identified container to be separated out and to be held in a buffering unit. The containers can be removed again later from this buffering unit, so that a further reduction in losses can be achieved in this way. In a further advantageous embodiment the first handling unit has a plurality of handling elements. These can be gripping elements for example, which convey the containers along a pre-set path. In this case for example a specified handling element can be identified which then separates out the container held by it.

The present invention further relates to a method of handling containers, in which the containers are handled in a first pre-set manner in a first handling unit and are then handled in a second planned manner in a second handling unit with a plurality of handling elements. According to the invention an atypical state of at least one handling element or a container handled by this handling element is recognized and this handling element or the container handled by this handling element has assigned to it at least one container to be handled upstream with respect to this handling element. In this way, an engagement, which occurs upstream and which in the further operating sequence of the machine can have the effect that the faulty handling element will produce no further unnecessary losses, is also proposed in the case of the method according to the invention.

It is advantageous if the container to be handled in the future by the first handling element is separated out.

It is preferable if all those containers are separated out which would be handled in the future by the handling element (in question, recognized as operating atypically). In this case, in particular when a fault is recognized, all the containers are separated out which would arrive at this special handling element in the future, which can thus be switched to non-operational.

It is preferable if the containers to be separated out are separated out after a heating procedure for the containers. In a further advantageous embodiment the containers to be separated out are separated out after the blow-moulding process, and, in a particularly preferred manner, are arranged or collected in a buffering device. As a result, the part of the installation mounted downstream can advantageously be supplied from the buffer in the event of brief stops.

Further advantages and embodiments may be seen in the accompanying figures.

BRIEF DESCRIPTION OF THE DRAWINGS

In the figures:
FIG. 1 shows a device according to the invention in a first embodiment, and
FIG. 2 shows a device according to the invention in a second embodiment.

DETAILED DESCRIPTION

FIG. 1 shows a device 1 according to the invention for the handling of containers 10. In this case the reference number 2 designates a first handling unit in the form of a conveying device 2. This conveying device 2 is designed in this case in the form of a chute, along which containers 10 or chains of containers are conveyed. In this region the containers are not yet separated at a distance. A magazine or even a sorting means 34 for the containers, which places the containers in a specified uniform starting position, can be provided upstream with respect to this first handling unit. In the present case the containers are pre-forms of plastics material from which bottles are produced in the further course of production.

The reference number 5 designates a clock-timed wheel which transfers the containers to a conveying device (not shown), this conveying device conveying the containers or pre-forms through a heating device 3. The conveying device can be designed for example in the form of a chain with mandrels for positioning the containers. After this clock-timed wheel 5 the containers are conveyed separately. A separation device 16, which can separate out individual containers 10 in a controlled manner, is provided directly on or at this clock-timed wheel 5. In this way, gaps can be intentionally formed on the conveying path of the containers. Then, as mentioned above, the containers are conveyed through the heating device 3 and are heated there. In this case the conveying device of the heating device 3 has holding elements, as already mentioned, for the containers, for example in the form of mandrels. Suitable heating devices are known for example from DE 203 11 657 U.

After that, the containers are transferred to a blow-moulding device 8, this blow-moulding device having a blow-moulding wheel 8a with a plurality of blow-moulding stations arranged thereon.

After the pre-forms have been expanded to form containers (plastics-material bottles) in this blow-moulding station, they are transferred to a rinsing unit 6. In this rinsing unit 6 (also referred to as a rinser) the containers 10 already produced are rinsed with clear water. This rinsing unit is followed by a plurality of conveying stars or conveying wheels 32, an internal or external disinfecting of the containers for example with $H_2O_2$ or the like also taking place in this region.

The reference number 4 designates a filling device which has a plurality of handling elements 14a, 14b, 14c for filling the containers. This filling device is followed by a closing device 9 which closes the containers which have already been filled.

The reference number 7 designates a state-recognition device (shown only diagrammatically), which detects states of the handling elements, such as—in particular but not exclusively-defective states. In addition, it would be possible for each handling element 14a, 14b, 14c to have associated with it a state-recognition device of this type or even for each handling element 14a, 14b, 14c to have associated with it a plurality of state-recognition devices 7 which detect different states of the handling element.

The state-recognition device 7 can be for example a through-flow sensor which detects whether a specified filling valve is filling the correct quantity of liquid into the container 10 at the correct time. The state-recognition device 7 could also be a sensor which detects specified parameters of the container handled, such as for example a sensor which determines the overfilling of the container with the drink. State-recognition devices of this type could also be provided on other handling units such as for example a disinfecting unit. A filling-level-monitoring device of this type can also optionally be arranged in the region downstream of the filling and/or closure machine.

After that, a labelling device (not shown) could be provided for the containers already filled.

In this way, the containers 10, as mentioned above, are conveyed separately starting from the clock-timed star 5 and are thus capable of being identified and tracked for the further procedure by means of a control device. If for example a recurring malfunction or defect is ascertained at the handling element 14a, it is possible to determine with the aid of a processor device 20 which containers will arrive at this faulty handling element or filling element 14a with each rotation of the filling device 4 in the future. This takes place in conjunction with the rotary-position sensors present in the machines. These corresponding containers can be separated out by way of the separating device 16 or can be prevented from running in by barriers and in this way a gap, which subsequently meets in a precise manner the faulty filling element or handling element 14a situated downstream, can be produced in an intentional, controlled manner upstream with respect to the filling device 4. Gaps are thus consciously produced in a continuous sequence of containers, these gaps being intentionally produced upstream with respect to a handling element ascertained to be faulty. The separating device can be a flap mechanism or a barrier which is able to separate out individual containers from a flow of containers or to form gaps.

FIG. 2 shows a further embodiment of a device according to the invention. This likewise has the main elements shown in FIG. 1, such as a heating device 3, a blow-moulding device 8, a disinfecting device 32, a clear-water rinsing device 6 and a filling device 4, downstream of which a closure device 9 is arranged. In contrast to the embodiment shown in FIG. 1, in this case the containers 10 are not separated out upstream or in front of the heating device 3 or in front of the blow-moulding device 8, but the containers are first conveyed through the heating device 3, are then blow-moulded in the blow-moulding device 8 and in the event of a fault being detected in a handling element 14a are diverted into a buffer path 22 only downstream or after the blow-moulding device along the arrow P1.

In this way, in this embodiment, finished containers are first produced, although they are not further handled after that, but are removed and stored in the finished blow-moulded state. In this embodiment specified handling elements 12a, 12b or 12c, which release the containers held by them, for example into the buffer path 22 named above, are activated in a purposeful manner. In this way, in this embodiment, the handling elements 14a, 14b, 14c have associated with them, in particular in the event of a fault, specified handling elements 12a, 12b, 12c which guide those containers which would arrive at a faulty handling element 14a, 14b or 14c in the subsequent handling procedure of the installation.

In the embodiment shown in FIGS. 1 and 2 the second handling unit is the filling device 4. It would also be possible, however, for the second handling unit to be a different unit, such as for example the disinfecting device 32, the rinser or the clear-water rinsing device 6, the closure device 9 or the blow-moulding device 8.

The containers separated along the arrow P1 can later be conveyed back again (arrow P2) when the fault of the installation or a breakdown of the blow-moulding device 8 has been rectified, in which case these containers are then first disinfected, rinsed with clear water and finally filled with a drink and then closed. The reference numeral 22 designates a corresponding buffering unit in which the containers 10 are temporarily stored.

Guiding through a gap consciously produced in the container flow and barring or switching to inactive all the handling members converging downstream of the gap can be carried out without difficulty by a proactive position tracking of the gap by the installation control device, in particular in conjunction with valves capable of being actuated in an electrically or electro-pneumatically controlled manner in rinsers and filling machines. In addition, a purposeful barring of the closure or labelling device can be carried out with the existing control appliances.

All the features disclosed in the application documents are claimed as being essential to the invention, insofar as they are novel either individually or in combination as compared with the prior art.

What is claimed is:

1. A device for the handling of containers, the device comprising:
   a first handling unit which handles the containers in a first pre-set manner,
   a second handling unit, which is arranged downstream with respect to the first handling unit in the conveying direction of the containers, the containers being conveyed separately in a sequence, wherein the second handling unit has a plurality of handling elements for handling the containers, wherein the second handling unit has at least one state-recognition device, which detects a fault at the second handling unit by recognizing an atypical state of at least one of the handling elements or an atypical state of at least one container handled by at least one of the plurality of handling elements, and
   a separating device, positioned downstream from the first handling unit and upstream from the second handling unit, wherein at least one control device calculates an offset, based on the fault at the second handling unit, and causes the separating device to create a gap in the sequence of the containers, based on the offset, corresponding to a position of the fault at the second handling unit.

2. The device according to claim 1, wherein the control device causes every n-th container to be separated out, wherein n is the number of the plurality of handling elements.

3. The device according to claim 1, wherein the first handling unit and the second handling unit are synchronized with each other.

4. The device according to claim 1, wherein the second handling unit is a bottling device for the containers.

5. The device according to claim 1, wherein the first handling unit is a heating device for pre-forms.

6. The device according to claim 1, wherein the first handling unit is a blow-moulding device for containers.

7. The device according to claim 1, further comprising a buffering unit for separated containers.

8. The device according to claim 1, wherein the first handling unit has a plurality of handling elements for handling the containers.

9. A method of handling containers, comprising:
   handling the containers in a first pre-set manner in a first handling unit;
   handling the containers in a second pre-set manner in a second handling unit with a plurality of handling elements, the containers being conveyed separately in a sequence and thus capable of being identified and tracked for a further procedure by means of a control device;
   detecting a fault at the second handling unit by recognizing an atypical state of at least one of the plurality of handling elements or an atypical state of a container handled by at least one of the plurality of handling elements;
   calculating, via a processing device, an offset, based on the fault at the second handling unit; and
   causing, via the processing device, the separating device to create a clap in the sequence of the containers, based on the offset, corresponding to a position of the fault at the second handling unit.

10. The method according to claim 9, further comprising separating out those containers to be handled in the future by the handling element of atypical state.

11. The method according to claim 10, wherein the containers to be separated out are separated out after a heating procedure for the containers.

12. The method according to claim 10, wherein the containers to be separated out are arranged in a buffering unit.

13. A device for the handling of containers, comprising:
   a first handling unit structured and arranged to handle the containers in a first pre-set manner;
   a second handling unit, which is arranged downstream with respect to the first handling unit in the conveying direction of the containers, the second handling unit including:
      a plurality of handling elements for handling the containers, the containers being conveyed separately in a sequence and thus capable of being identified and tracked for a further procedure by means of a control device,
      at least one state-recognition device configured to detect a fault at the second handling unit by recognizing an atypical state of at least one of the plurality of handling elements or an atypical state of at least one container handled by at least one of the plurality of handling elements; and
   a separating device, positioned downstream from the first handling unit and upstream from the second handling unit, wherein at least one control device calculates an offset, based on the fault at the second handling unit, and causes the separating device to create a gap in the sequence of the containers, based on the offset, corresponding to a position of the fault at the second handling unit.

14. The device according to claim 13, wherein the control device is configured to separate out every n-th container, wherein n is the number of the second handling elements.

15. The device according to claim 13, wherein the first handling unit and the second handling unit are synchronized with each other.

16. The device according to claim 13, further comprising a buffering unit for separated containers, and
   wherein the second handling unit is a bottling device for the containers,
   wherein the first handling unit is one of a heating device for pre-forms and a blow-moulding device for containers, and
   wherein the first handling unit has a plurality of handling elements for handling the containers.

17. The device according to claim 1, wherein the separating device produces gaps in a continuous sequence of containers wherein the gaps are intentionally produced upstream with respect to a handling element ascertained to be faulty.

18. The device according to claim handling 17, wherein the gap occurs at the faulty element.

19. The device according to claim 13, wherein the separating device produces gaps in a continuous sequence of containers wherein the gaps are intentionally produced upstream with respect to a handling element ascertained to be faulty.

20. The device according to claim 19, wherein the gap occurs at the faulty handling element.

21. The method according to claim 9, wherein the separating device produces gaps in a continuous sequence of containers wherein the gaps are intentionally produced upstream with respect to a handling element ascertained to be faulty.

22. The method according to claim 21, wherein the gap occurs at the faulty handling element.

* * * * *

UNITED STATES PATENT AND TRADEMARK OFFICE
CERTIFICATE OF CORRECTION

| | | |
|---|---|---|
| PATENT NO. | : 8,985,340 B2 | Page 1 of 1 |
| APPLICATION NO. | : 12/866834 | |
| DATED | : March 24, 2015 | |
| INVENTOR(S) | : Thomas Zech | |

It is certified that error appears in the above-identified patent and that said Letters Patent is hereby corrected as shown below:

IN THE CLAIMS

Column 8, line 2    Please delete the word "clap" and insert --gap--

Signed and Sealed this
Twentieth Day of October, 2015

Michelle K. Lee
*Director of the United States Patent and Trademark Office*